(12) United States Patent
Kashima

(10) Patent No.: US 6,653,565 B2
(45) Date of Patent: Nov. 25, 2003

(54) IC CARD WITH PLATED FRAME AND METHOD FOR MANUFACTURING THE SAME

(75) Inventor: Masanori Kashima, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/131,810

(22) Filed: Apr. 24, 2002

(65) Prior Publication Data

US 2002/0160630 A1 Oct. 31, 2002

(30) Foreign Application Priority Data

Apr. 27, 2001 (JP) .......................... 2001-131449

(51) Int. Cl.$^7$ .............................................. H01L 23/02
(52) U.S. Cl. ..................... 174/52.4; 257/679; 235/492
(58) Field of Search ............... 174/52.4, 254, 174/260, 259; 257/679; 361/736, 737, 749; 235/492, 487, 488

(56) References Cited

U.S. PATENT DOCUMENTS

| | | | |
|---|---|---|---|
| 5,531,145 A | * 7/1996 | Haghiri-Tehrani | ............. 83/27 |
| 5,581,065 A | * 12/1996 | Nishikawa et al. | ......... 235/492 |
| 5,780,837 A | * 7/1998 | Garcia | ........................ 235/492 |
| 6,320,751 B2 | * 11/2001 | Takeda et al. | .............. 361/737 |
| 2000/0008147 | 1/2002 | Coiton et al. | |

FOREIGN PATENT DOCUMENTS

| | | | | |
|---|---|---|---|---|
| EP | 328124 A2 | * 8/1989 | ......... | G06K/19/06 |
| JP | 6-24188 | 2/1994 | | |
| JP | 08329206 A | * 12/1996 | ......... | G06K/19/00 |

* cited by examiner

Primary Examiner—Dean A. Reichard
Assistant Examiner—Carmelo Oliva
(74) Attorney, Agent, or Firm—Merchant & Gould P.C.

(57) ABSTRACT

An IC card with a plate frame includes a plate frame having an aperture and a small-size IC card fitted in the aperture. The shapes and dimensions of the aperture and the small-size IC card are approximately the same. The small-size IC card is formed by shearing the plate frame by the use of a pressing mold. It is possible to take out an IC card without burrs on the outer circumference and it is easy to separate the small-size IC card from the plate frame.

6 Claims, 5 Drawing Sheets

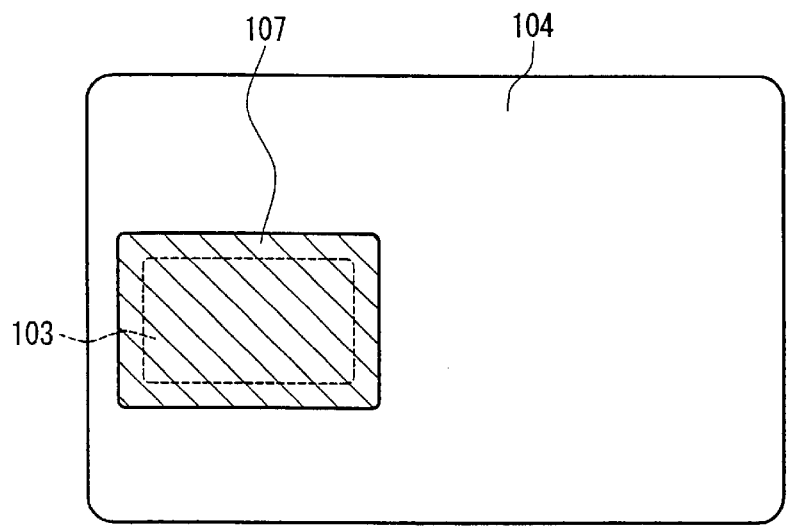
FIG. 5
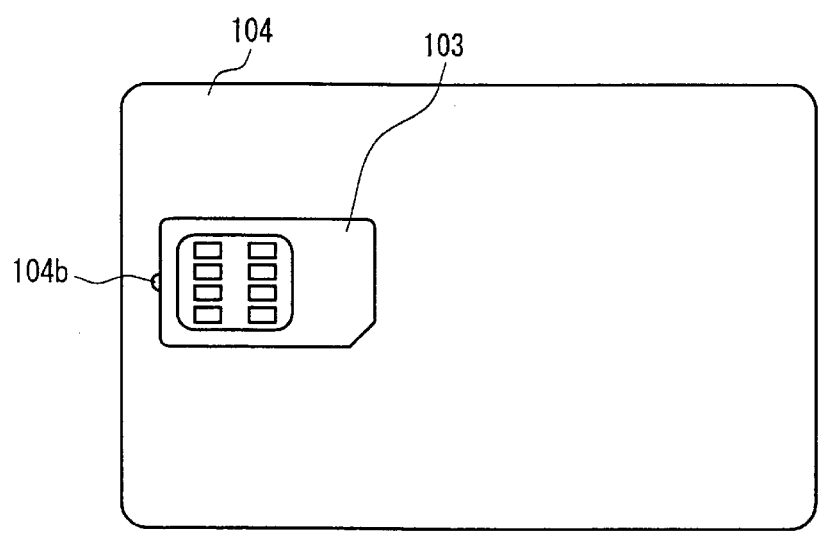
FIG. 6
FIG. 7

IC CARD WITH PLATED FRAME AND METHOD FOR MANUFACTURING THE SAME

BACKGROUND OF THE INVENTION

1. Field of the Invention

The present invention relates to an IC card with a plate frame on which an IC module is installed, and a method for manufacturing the same.

2. Description of the Prior Art

Recently, a cellular phone, etc. has been provided with a small-size IC card, in which an integrated circuit called a SIM (subscriber Identity Module) for identifying subscribers, in which a CPU or memory is incorporated and having an electrode for communication with the outside. Also in various kinds of small-sized equipment, this kind of application is made for improving the security. A conventional small-size IC card used for such a purpose is provided as an IC card with a plate frame having a structure shown in FIG. 8 as disclosed in, for example, JP 6 (1994)-24188A.

In the IC card with a plate frame shown in FIG. 8, a micromodule 22 is installed in a standard format chip card 20 and a groove 32 is formed along the outline of a small-size card 30 that is smaller than the chip card 20. On the outer circumference of the card 30, a plurality of bridges 34 are left as connection portions between the card 30 and the standard format chip card 20. The thickness of the bridge 34 is smaller than that of the small-size card 30. In actual use, by cutting these bridges 34, the small-size card 30 is taken out.

However, in the above-mentioned conventional configuration of the IC card with a plate frame, when the bridges are cut to take out the small-size card, a burr remains on the outer circumference of the small-size card. Thus, there is a problem in that when the card is incorporated into a telephone, this burr may be an obstacle. Furthermore, in order to make it easy to separate the small-size card, the width or thickness of the bridge sometimes is reduced. However, in this case, the small-size card may be separated unintentionally before an actual use. On the other hand, if the width or thickness of the bridge is increased, the small-size card cannot be separated easily. Thus, there was a problem in that it was difficult to adjust the width or thickness of the bridge.

SUMMARY OF THE INVENTION

With the foregoing in mind, it is an object of the present invention to provide an IC card with a plate frame that can be treated easily by solving the problems of the conventional IC card with a plate frame.

In order to achieve the above-mentioned object, the IC card with a plate frame of the present invention includes a plate frame having an aperture and a small-size IC card fitted into the aperture. The shapes and the dimensions of the aperture and the small-size IC card are approximately the same, and the small-size IC card is formed by shearing of the plate frame by the use of a pressing mold.

According to this configuration, since the small-size IC card and the plate frame are separated initially from each other, it is possible to take out the small-size IC card without burrs on the outer circumferences. Furthermore, it is possible to obtain the IC card with a plate frame in which the separation is easy.

Furthermore, after data are recorded on the small-size IC card in a standard format state of the IC card with a plate frame by using a conventional apparatus and system, when the data need to be changed, the small-size IC card can be reinstalled in the open potion of the plate frame easily. Then, it is possible to change the data recorded on the small-size IC card with a conventional apparatus and system.

It is preferable that the small-size IC card is press-fitted into the aperture.

In the above-mentioned configuration, it is preferable that the plate frame having the small-size IC card is provided with at least one slit in the vicinity of the outline of the small-size IC card. According to this configuration, when the small-size IC card is press-fitted into the aperture, the distortion generated in the IC card by a plate frame is absorbed and relaxed by the slit, thus preventing the generation of distortion on the surface appearance.

Furthermore, it is preferable that the slit is provided so that it surrounds the outline of the small-size IC card. According to this configuration, the distortion generated in the IC card with a plate frame can be absorbed and relaxed more effectively when the small-size IC card is press-fitted into the aperture.

Furthermore, it is preferable that a film having an adhesive layer is attached to one surface of the small-size IC card and a surface of the plate frame that is continuous with the surface of the small-size IC card, and thereby the small-size IC card is fixed to the plate frame. According to this configuration, it is possible to obtain an IC card with a plate frame in which the separation of the small-size IC card is avoided when it is handled in a state of a standard format size and the separation is easy.

Furthermore, it is preferable that the plate frame adjacent to the aperture is provided with a cut-off. According to this configuration, the small-size IC card can be separated from the plate frame more easily.

Furthermore, the method for manufacturing an IC card with a plate frame includes providing a concave portion on a card substrate on which a plate frame is to be formed; placing an IC module on the concave portion; forming the plate frame and the small-size IC card by shearing of the card substrate into a shape of the small-size IC card by use of a pressing mold in a range from ½ to ⅘ of the thickness of the card substrate; and returning the small-size IC card to the aperture formed on the plate frame so that the surface of the plate frame and the surface of the small-size IC card are on approximately the same plane.

According to this configuration, after the half-die processing by the use of a pressing mold, by returning the small-size IC card to the aperture of the plate frame, it is possible to manufacture the IC card with a plate frame at high productivity and at high cost.

BRIEF DESCRIPTION OF THE DRAWINGS

FIG. 5 is a side view showing an IC card with a plate frame that is fixed with an adhesive film according to another embodiment of the present invention.

FIG. 6 is a rear view of the IC card with a plate frame of FIG. 5.

FIG. 7 is a plan view of the IC card with a plate frame in which a cut-off is provided at an edge of an aperture according to a further embodiment of the present invention.

DETAILED DESCRIPTION OF THE INVENTION

Hereinafter, preferable embodiments of the present invention will be explained with reference to the drawings.

Figure 1A:
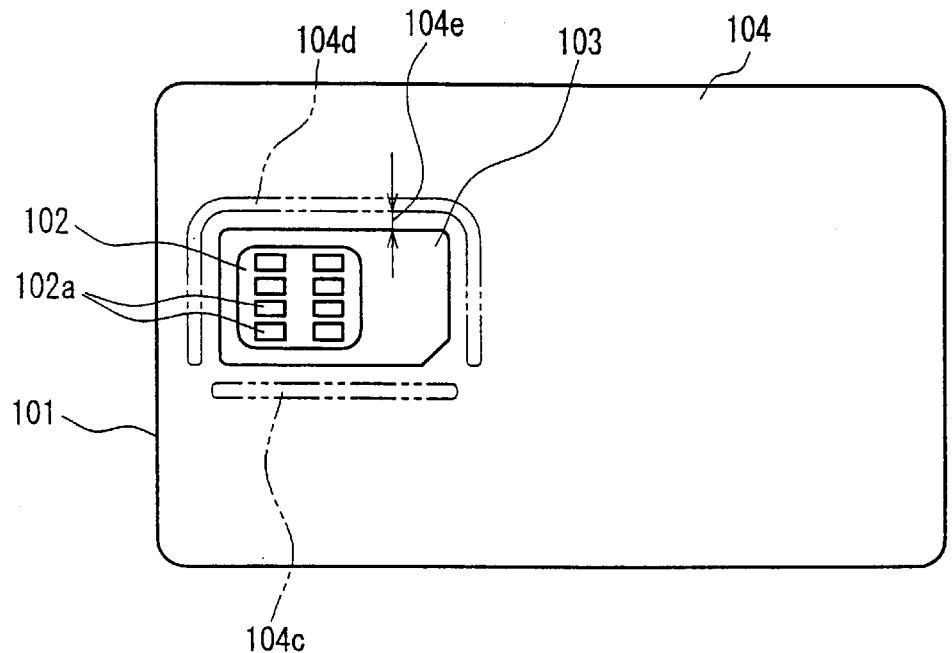
FIG. 1A is a plan view showing an IC card with a plate frame according to one embodiment of the present invention.
Figure 2:
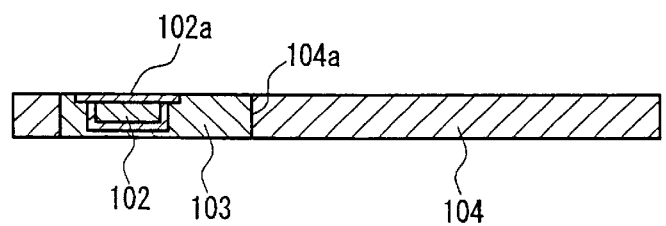
FIG. 2 is a cross-sectional view showing the IC card with a plate frame of FIG. 1A.
Figure 3:
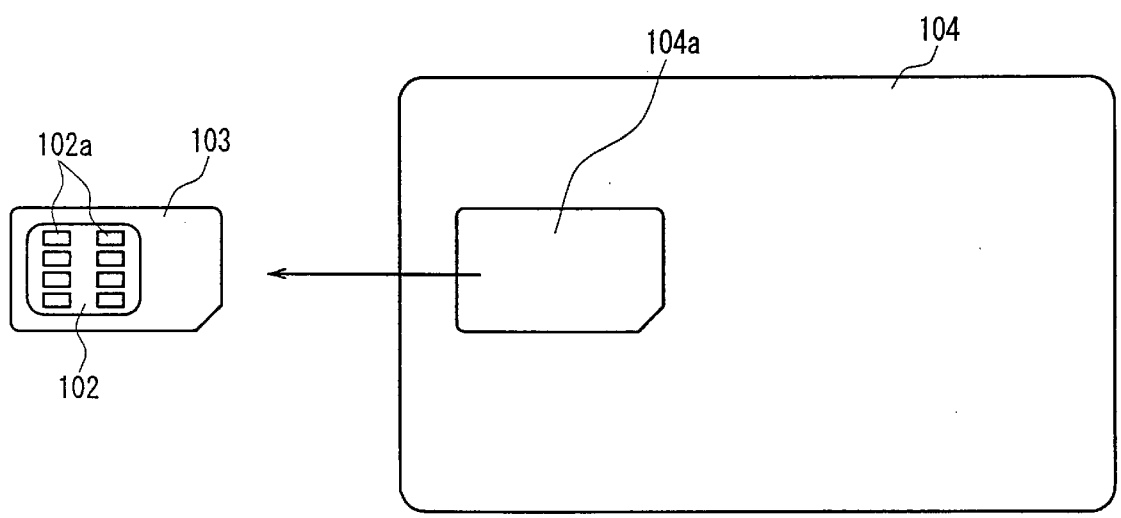
FIG. 3 is a plan view showing a state in which a small-size IC card is separated from the IC card with a plate frame of FIG. 1A.

FIG. 1A is a plan view of an IC card with a plate frame 101 according to one embodiment of the present invention and FIG. 2 is a cross-sectional view thereof. FIG. 3 shows a state in which a small-size IC card 103 is separated from the IC card with a plate frame 101. The separated small-size IC card 103 may be incorporated into equipment (not shown) such as a cellular phone etc.

Figure 1B:
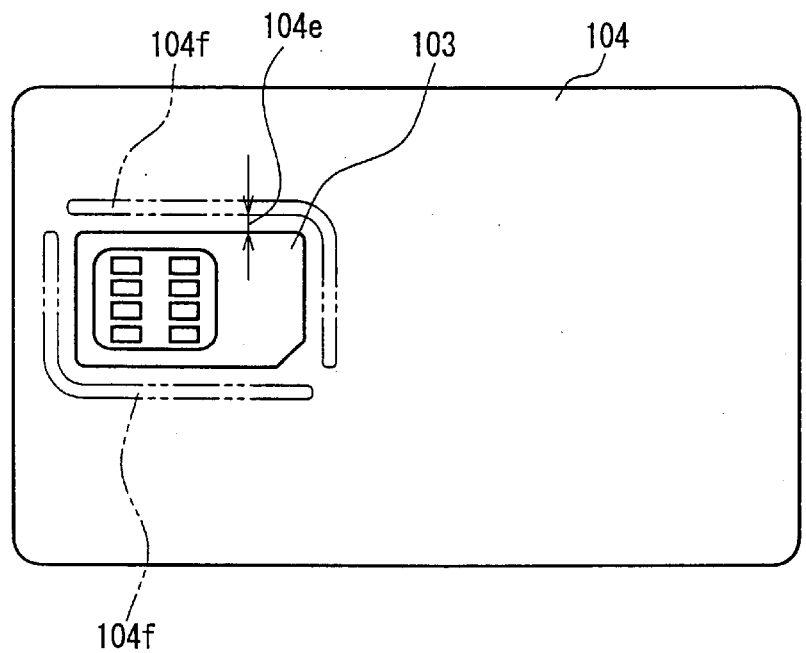
FIG. 1B is a plan view showing a partially changed example of the IC card with a plate frame of FIG. 1A.

The IC card with a plate frame 101 shown in FIGS. 1 and 2 includes a small-size IC card 103 on which an IC module 102 is installed and a plate frame 104. An integrated circuit, although it is not shown, is incorporated into an IC module 102. In order to write/read data into/from the integrated circuit, a plurality of contacts 102a (external connection terminals) electrically connected to the integrated circuit are provided so that they can be brought into contact with external equipment and communicated therewith.

As is apparent from FIG. 2 or 3, the plate frame 104 has an aperture 104a whose shape and dimension is substantially the same as that of the small-size IC card 103. The small-size IC card 103 is press-fitted into an aperture 104a without a gap.

Figure 4A:
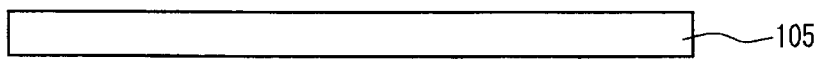
FIGS. 4A to 4F are cross-sectional views showing a manufacturing process for the IC card with a plate frame of FIG. 1A.

Hereinafter, a method for manufacturing the IC card with a plate frame 101 will be explained with reference to FIG. 4. First, as shown in FIG. 4A, a card substrate 105 having a size in accordance with the ISO-7816, that is, an international standard for IC cards, is prepared. This card substrate 105 can be prepared by press-working a plate having a predetermined thickness made of a vinyl chloride resin or ABS resin. Alternately, if an ABS resin is used, injection molding by the use of a molding die may be carried out so as to form the resin into a predetermined shape.

Figure 4B:
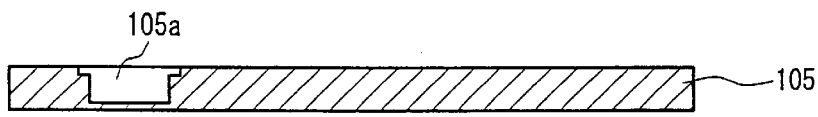

Next, as shown in FIG. 4B, a concave portion 105a is formed in the card substrate 105. This concave portion 105a can be formed by a so-called contour boring method using an end mill or by molding with a molding die at the same time the card substrate 105 is formed when ABS resin is used.

Figure 4C:
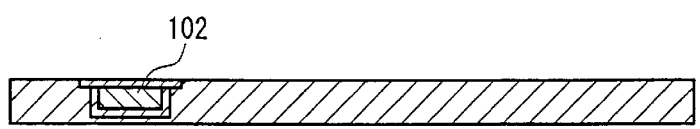

Next, as shown in FIG. 4C, an IC module 102 is installed into the concave portion 105a so as to form a card having a size in accordance with the ISO-7816. The IC module 102 can be installed into the concave portion 105a by conventional methods, for example, a method for adhering and fixing with a hot-melt sheet or a fast-setting adhesive (not shown), or the like.

Figure 4D:
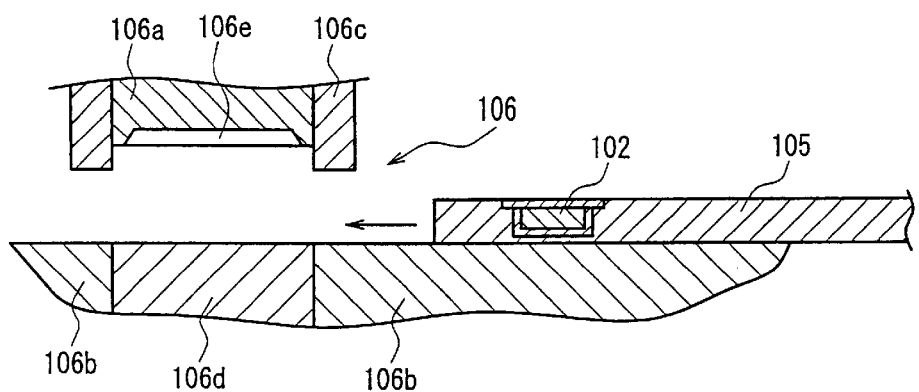

Next, as shown in FIG. 4D, a card substrate 105 on which the IC module 102 is installed is set in a pressing mold 106. The pressing mold 106 includes a punch 106a, a die 106b, a stripper 106c and a movable mold receiver 106d. Those members are combined as a unit (not shown). The punch 106a and the stripper 106c are movable with respect to the die 106b while a predetermined relationship is kept. The punch 106a and the die 106b have the shape and dimension corresponding to the small-size IC card 103. Furthermore, the punch 106a may be provided with an escapement 106e so that the IC module 102 is not damaged.

Figure 4E:
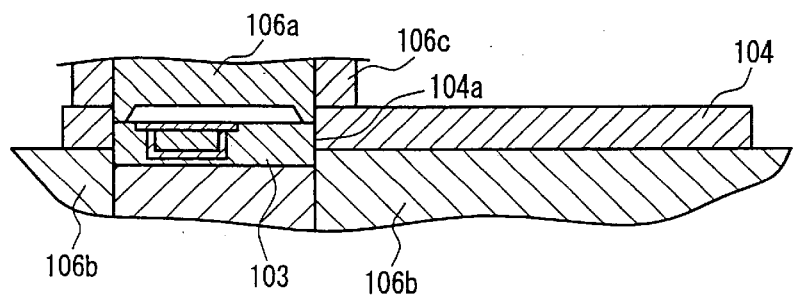

Next, as shown in FIG. 4E, the small-size IC card 103 and the aperture 104a, which have approximately the same shapes and dimensions, are formed by shearing by the use of the punch 106a guided by the stripper 106c and the die 106b. At this time, the punch 106a is moved downward not to the bottom surface of the card substrate 105 but to ½ to ⅘ of the thickness of the card substrate 105. That is, in the case of a size in accordance with the ISO-7816, since the standard thickness of the card is 0.76 mm, the punch 106a is to be moved downward to approximately 0.35 mm to 0.60 mm of the thickness. On the other hand, a movable die receiving portion 106d is lowered in accordance with the lowering of the punch 106a. Therefore, the small-size IC card 103 is not separated completely from the aperture 104a. Thereafter, the movable die receiving portion 106d is raised to the bottom surface of the card substrate 105 in accordance with the raising of the punch 106a.

Figure 4F:
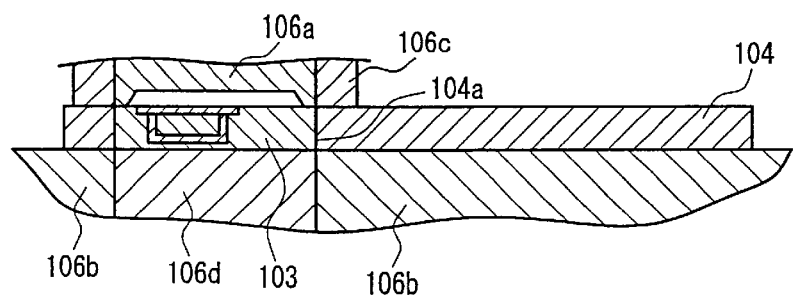
Figure 8:
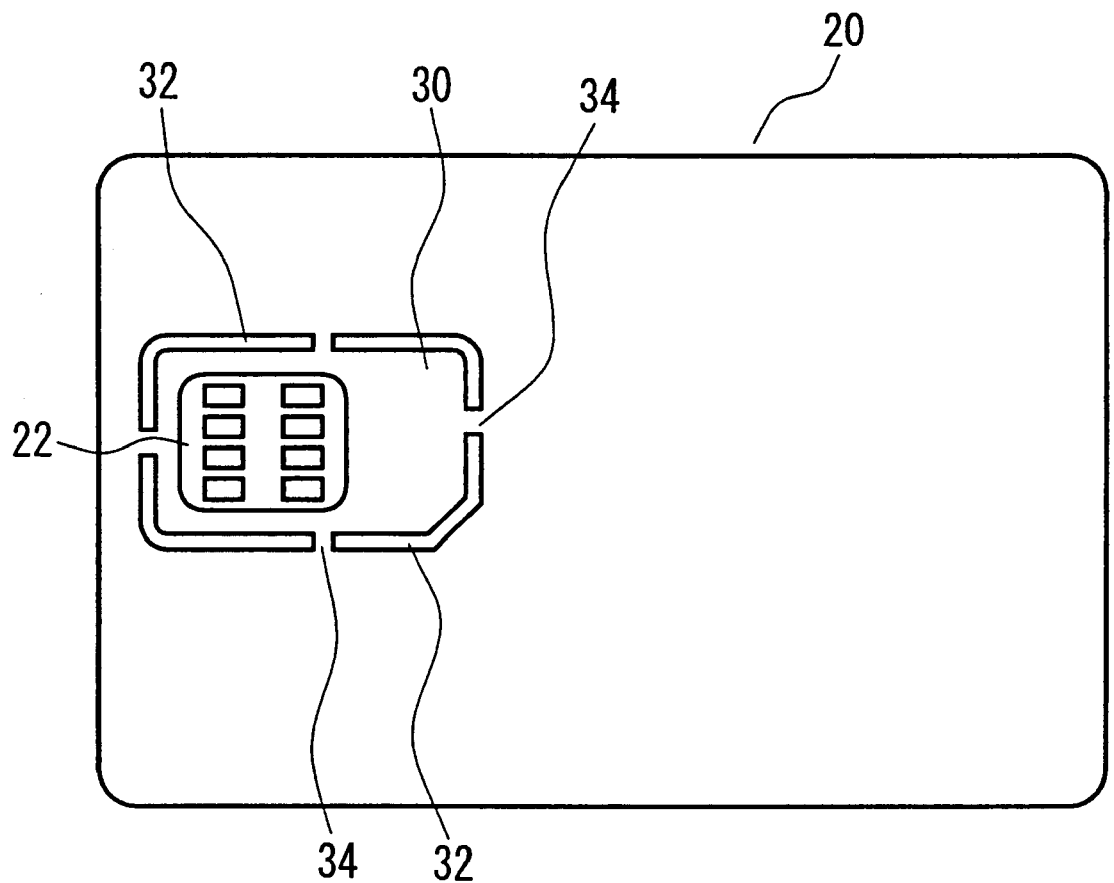
FIG. 8 is a plan view showing a conventional IC card with a plate frame.

As a result, as shown in FIG. 4F, the small-size IC card 103 and the card substrate 105 are on approximately the same plane. Thus, the structure of the IC card with a plate frame 101 shown in FIG. 1 can be obtained.

In the IC card with a plate frame 101 manufactured like this, when the shearing is carried out, expansion occurs in the material in the vicinity of the aperture 104a of the plate frame 104 of the card substrate 105. Thus, the dimension of the aperture 104a becomes somewhat smaller than the outer dimension of the small-size IC card 103. Therefore, since the small-size IC card 103 tends to be press-fitted with respect to the portion 104a, the small-size IC card 103 is not separated from the aperture 104a during usual handling. In the case where the card material using an ABS resin is subjected to press-working, the difference between the outer dimension of the small-size IC card 103 and the inner dimension of the aperture 104a, that is, a margin for press-fitting, is approximately 0.1 mm in the direction along the shorter side and approximately 0.15 mm in the direction along the longer side. With this margin for press-fitting, the small-size IC card 103 is held in the aperture 104a.

As mentioned above, when the small-size IC card 103 is press-fitted into the aperture 104a, a distortion may occur in a surface appearance of the IC card with a plate frame 101. In order to solve this problem, it is effective to provide, as shown in FIG. 1A, a slit 104c (shown by alternate long and short dashed lines) in the vicinity of one side of the aperture 104a on the plate frame 104. With this slit 104c, stress can be absorbed and relaxed, thus preventing the distortion from generating. Furthermore, as shown in FIG. 1A, in addition to the slit 104c, a U-shaped slit 104d is provided in the vicinity of the other three sides (shown by alternate long and short dashed lines) so as to surround the outline of the small-size IC card 103. Thereby, the effect of absorbing and relaxing stress is increased, and thus the generation of the distortion can be prevented more reliably.

Instead of silts 104c and 104d shown in FIG. 1A, two slits 104f may be formed in an L-shape and may be arranged so as to surround two arbitrary sides of small-size IC card 103, respectively. The distance 104e between the slit 104c, 104d or the slit 104f and the aperture 104a is preferably shorter from the viewpoint of solving the distortion. However, if the distance is too short, the strength of the plate frame 104 becomes insufficient and tends to be broken or the small-size IC card 103 may be separated. Therefore, it is preferable that the distance is set in the range from 1.5 mm to 3 mm. Furthermore, the width of the slit 104c, 104d and 104f cannot be set too large when the entire strength of the IC card with a plate frame 101 is taken into account. On the other hand, if the width is too short, the mold for punching may be damaged. Therefore, it is preferable that the width is set to be 1 mm to 2 mm. The slits 104c, 104d and 104f can be formed easily by providing a trimming punch (not shown) in the same mold when the small-size IC card 103 is sheared.

As mentioned above, in the shearing process, the punch 106a is lowered to ½ to ⅘ of thickness of the card substrate 105. This is an appropriate range capable of actually completing the shearing and preventing the small-size IC card 103 from protruding completely from the aperture 104a. In this embodiment, the process of shearing and the process of returning the small-size IC card 103 to the aperture 104a are carried out with the same mold. However, the processes may be carried out by using different molds, respectively.

Furthermore, as shown in FIGS. 5 and 6, the small-size IC card 103 may be fixed to the plate frame 104 with a film 107 having an adhesive layer in consideration of an external force such as a strong bending force, etc. being applied. Thereby, it is possible to prevent the small-size IC card 103 from being separated effectively. FIGS. 5 and 6 illustrate the example in which the film 107 with an adhesive layer is disposed on the rear side that is opposite to the surface on which the external terminal of the small-size IC card 103 is arranged. However, the film 107 may be fixed to the front surface of the small-size IC card 103. In this case, although not shown in the drawing, a hole for inspecting the small-size IC card 103 is preferably provided at the position corresponding to the IC module 102 of the film 107.

Furthermore, as shown in FIG. 7, it is effective to provide a cut-off 104b on a part of the plate frame 104 adjacent to the aperture 104a. By inserting a nail or a pin etc. into this cut-off 104b, the small-size IC card 103 can be separated from the plate frame 104 easily.

As is apparent from the above-mentioned explanation, the IC card with a plate frame of the present invention is obtained by forming the small-size IC card and the plate frame having the aperture that is approximately the same shape and dimension from one card substrate and fitting the small-size IC card into the aperture. Therefore, since the small-size IC card is separated initially from the plate frame, it is possible to configure the IC card with a plate frame according to which no burrs are formed around the circumference of the small-size IC card when the small-size IC card is taken out, and the separation can be carried out easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An IC card with a plate frame comprising:

a plate frame having an aperture, a small-size IC card with an IC module mounted on the small-size IC card, the small-size IC card having approximately the same shape as that of the aperture, and at least one slit disposed on the plate frame along and outside of at least a part of an outline of the aperture;

wherein the dimension of the aperture is smaller than the outer peripheral dimension of the small-size IC card so that the small-size IC card is fitted into the aperture with a pressure being imparted between the inner peripheral edge of the aperture and the outer peripheral edge of the small-size IC card, and the small-size IC card is capable of being held by the inner peripheral edge of the aperture.

2. The IC card with a plate frame according to claim 1, wherein a plurality of the slits are provided that substantially surround the outline of the small-size IC card.

3. The IC card with a plate frame according to claim 1, wherein a film having an adhesive layer is attached to one surface of the small-size IC card and a surface of the plate frame that is continuous to the surface of the small-size IC card, and thereby the small-size IC card is fixed to the plate frame.

4. The IC card with a plate frame according to claim 3, wherein the plate frame adjacent to the aperture is provided with a cut-off.

5. The IC card with a plate frame according to claim 1, wherein the plate frame adjacent to the aperture is provided with a cut-off.

6. A method for manufacturing an IC card with a plate frame, the method comprising:

providing a concave portion on a card substrate from which a plate frame is to be formed;

installing an IC module in the concave portion;

forming the plate frame and the small-size IC card by shearing the card substrate with a shape of the small-size IC card by use of a pressing mold in a range from 1/2 to 4/5 of the thickness of the card substrate; and returning the small-size IC card to the aperture formed in the plate frame so that a surface of the plate frame and a surface of the small-size IC card are on approximately the same plane.

* * * * *